(12) United States Patent
Stoll

(10) Patent No.: US 6,505,862 B1
(45) Date of Patent: Jan. 14, 2003

(54) POWER STEERING APPARATUS

(75) Inventor: Richard A. Stoll, Royal Oak, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/565,336

(22) Filed: May 5, 2000

(51) Int. Cl.[7] .............................. F16L 5/00; B62D 5/22
(52) U.S. Cl. ................... 285/205; 285/136.1; 285/139.2
(58) Field of Search ........................... 285/136.1, 139.2, 285/205

(56) References Cited

U.S. PATENT DOCUMENTS

| 4,289,335 A | 9/1981 | Olbermann |
| 4,826,486 A | 5/1989 | Palsrok et al. |
| 4,938,510 A | 7/1990 | Gmeiner et al. |
| 5,046,765 A | 9/1991 | Usui |
| 5,271,476 A | 12/1993 | Minamibata |
| 5,433,183 A * | 7/1995 | Vansnick ................ 285/205 X |
| 5,505,276 A | 4/1996 | Luibrand |
| 5,593,279 A * | 1/1997 | Hayashi ................... 285/205 X |
| 5,730,481 A | 3/1998 | Szabo et al. |
| 5,820,168 A | 10/1998 | De Giacomoni |
| 5,904,221 A | 5/1999 | Breitweg et al. |

* cited by examiner

Primary Examiner—Lynne H. Browne
Assistant Examiner—John R. Cottingham
(74) Attorney, Agent, or Firm—Tarolli, Sundheim, Covell, Tummino & Szabo L.L.P.

(57) ABSTRACT

A power steering apparatus (10) includes a housing (22) defining a chamber (25) for holding power steering fluid. The housing (22) has an opening (62, 153, 213) defined by a projection (64, 152, 212) integrally formed on the housing. A conduit (50) extends into the opening (62, 153, 213). A connector assembly (60, 150, 210) connects the conduit (50) with the projection (64, 152, 212) on the housing (22). The connector assembly (60, 150, 210) includes a member (68, 160, 218) engaging the conduit (50) and the projection (64, 152, 212) to connect the conduit with the projection.

28 Claims, 3 Drawing Sheets

POWER STEERING APPARATUS

FIELD OF THE INVENTION

The present invention relates to a power steering apparatus, and more specifically, to a power steering apparatus having a connector assembly which connects a conduit with a housing having a chamber which holds power steering fluid.

BACKGROUND OF THE INVENTION

A known power steering apparatus includes a hydraulic motor having a housing which encloses a chamber. Power steering fluid under pressure is conducted through a conduit to the chamber during turning of steerable vehicle wheels in one direction. Power steering fluid is conducted from the chamber through the conduit during turning of steerable vehicle wheels in the opposite direction. It is desirable to be able to quickly and securely interconnect the conduit and the housing.

A known connection between a conduit for conducting power steering fluid and a housing includes a base fixedly connected with the housing. The base is welded to the housing to connect the base to the housing. A clip engages the base and the conduit to hold the conduit against movement relative to the housing.

SUMMARY OF THE INVENTION

A power steering apparatus of the present invention includes a housing defining a chamber for holding power steering fluid. The housing has an opening defined by a projection integrally formed on the housing. A conduit extends into the opening. A connector assembly connects the conduit with the projection on the housing. The connector assembly includes a member engaging the conduit and the projection to connect the conduit with the projection.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE INVENTION

Figure 1:
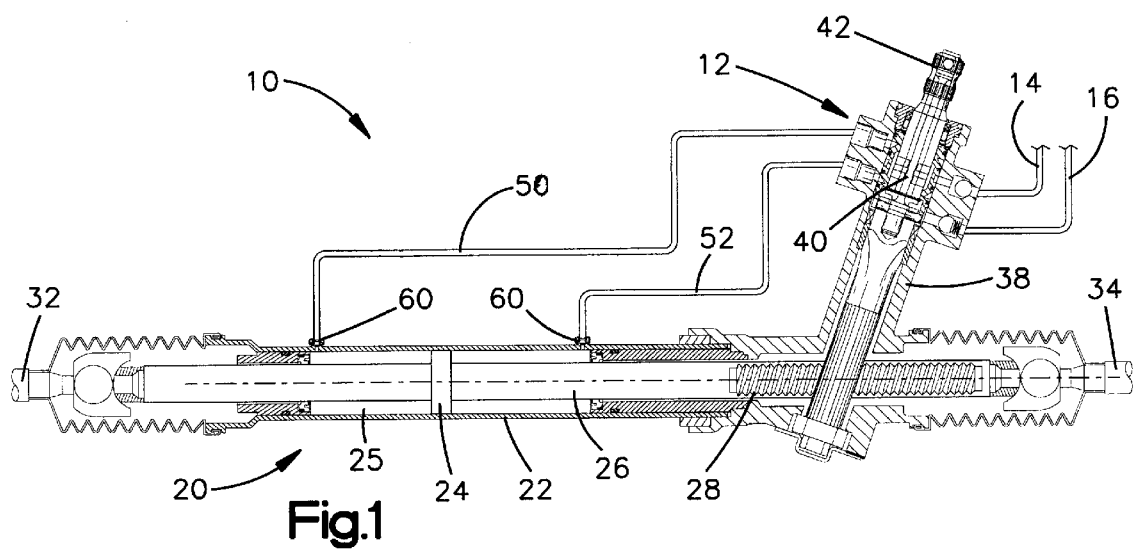
FIG. 1 is a schematic illustration of a portion of a power steering apparatus.

A vehicle power steering apparatus 10 (FIG. 1) includes a power steering valve 12 which is connected with the outlet of a power steering pump (not shown) by a conduit 14. A second conduit 16 connects the power steering valve 12 with a reservoir for the pump.

The power steering valve 12 controls the flow of fluid to and from a power steering motor 20. Although the power steering motor 20 could have many different constructions, in the illustrated embodiment of the invention, the power steering motor includes a cylindrical housing 22 which encloses a piston 24.

The piston 24 is disposed in a cylindrical chamber 25 in the housing 22. The piston 24 is connected with a rack bar 26 on which rack teeth 28 are disposed. Opposite ends of the rack bar 26 are connected with steerable vehicle wheels, in a known manner, by tie rods 32 and 34. The power steering valve 12 includes a valve housing 38 which encloses a rotatable valve core 40. An input end portion 42 of the valve core 40 is connected with a vehicle steering wheel. Upon rotation of the vehicle steering wheel, the power steering valve 12 is operable to connect either a conduit 50 or a conduit 52 in fluid communication with the outlet from the power steering pump through the conduit 14. The other one of the conduits 50 and 52 is connected with the reservoir through the conduit 16.

The general construction and mode of operation of the power steering apparatus 10 is well known. It is contemplated that the power steering apparatus 10 may have a construction and mode of operation which is generally similar to the construction and mode of operation of the power steering apparatus disclosed in U.S. Pat. Nos. 5,505,276 and 4,276,812.

Connector assemblies 60 are provided to connect the conduits 50 and 52 with the housing 22. The connector assemblies 60 are identical and, therefore, only the connector assembly connecting the conduit 50 with the housing 22 will be described in detail. The housing 22 (FIG. 2) has an opening 62 defined by a projection 64 integrally formed on the housing. The projection 64 is formed on the housing by punching the opening 62 in the housing from an inside of the housing outward. The projection 64 is then struck from the outside while the housing 22 is supported from the inside causing the top edge of the projection to roll over and form a radially outwardly extending lip 66.

The connector assembly 60 (FIG. 2) includes a member or clip 68 engaging the projection 64 on the housing 22 and a radially extending bead 70 on the conduit 50. The clip 68 presses the bead 70 on the conduit 50 against an annular seal 72 to seal a joint between the projection 64 and the conduit. The seal 72 is pressed between the bead 70 and the projection 64.

The bead 70 on the conduit 50 has an annular configuration. The bead 70 is integrally formed as one-piece with the conduit 50. However, if desired, the bead 70 could be formed separately from the conduit 50 and fixedly connected with the conduit.

The clip 68 (FIG. 3) includes a retainer portion 74 and a pilot portion 76. When the conduit 50 is being connected with the projection 64 on the housing 22, the conduit is forced downward (as viewed in FIG. 2) into the opening 62 in the housing by the pilot portion 76 (FIG. 3) of the clip 68. The retainer portion 74 of the clip 68 holds the conduit 50 in the opening 62 formed in the housing 22. This enables the clip 68 to hold the conduit 50 against axial movement relative to the projection 64 and the housing 22.

The clip 68 has a generally rectangular configuration. The clip 68 includes an outer retainer wall 82 (FIG. 3) with a generally U-shaped recess 84 in which the conduit 50 is received. An inner retainer wall 88 extends parallel to the outer retainer wall 82. The inner retainer wall 88 has a generally U-shaped recess 90 which is axially aligned with the U-shaped recess 84 in the outer retainer wall 82. However, the U-shaped recess 90 in the inner retainer wall 88 is larger than the recess 84 in the outer retainer wall 82.

The U-shaped recess 90 in the inner retainer wall 88 receives a cylindrical stem section 94 (FIG. 2) of the projection 64. When the clip 68 is in the engaged condition, the inner retainer wall 88 presses against an annular downwardly, as viewed in FIG. 2, facing surface 98 on the lip 66 of the projection 64. This results in the lip 66 of the projection 64 and the bead 70 on the conduit 50 being gripped between the outer retainer wall 82 and the inner retainer wall 88 of the clip 68.

The outer retainer wall 82 has side surface areas 102 and 104 that apply a downward (as viewed in FIG. 2) force against the bead 70 to move the conduit 50 downward into the opening 62. As this occurs, the seal 72 is axially compressed against the lip 66 of the projection 64. The bead 70 on the conduit 50 slides along the side surface areas 102 and 104 on the retainer wall 82. As this occurs, an arcuate closed end portion 106 (FIG. 3) of the recess 84 moves adjacent to the conduit 50.

Side walls 108 and 110 extend downward from the outer retainer wall 82. The side walls 108 and 110 extend parallel to each other and perpendicular to the outer retainer wall 82. An end wall 112 extends downward from the outer retainer wall 82 and is disposed between the side walls 108 and 110. The end wall 112 extends perpendicular to the outer retainer wall 82 and the side walls 108 and 110.

The inner retainer wall 88 is formed by flanges which extend inward from the side walls 108 and 110 and end wall 112. Thus, a generally rectangular flange 114 extends from an inner end of the side wall 108 in a direction toward the side wall 110. The flange 114 extends parallel to the outer retainer wall 82. Similarly, a generally rectangular flange 116 extends inward from the side wall 110 toward the side wall 108. The flange 116 extends parallel to the outer retainer wall 82 and is aligned with the flange 114 on the side wall 108. A generally rectangular flange 118 extends inward from the end wall 112 toward the flanges 114 and 116. The flange 118 extends parallel to the outer retainer wall 82 and is aligned with the flanges 114 and 116.

The flanges 114, 116, and 118 cooperate to form the inner retainer wall 88. In addition, the flanges 114, 116, and 118 define the U-shaped recess 90 in the inner retainer wall 88. The flanges 114, 116, and 118 are not directly connected with each other.

The flanges 114 and 116 are formed in such a manner as to resiliently grip the stem section 94 of the projection 64. The flange 114 (FIGS. 2 and 3) includes an arcuate edge portion 126 which engages cylindrical outer side surface 128 of the stem section 94 of the projection 64. The flange 116 includes an arcuate edge portion 130 which engages the cylindrical outer side surface 128 of the stem section 94 of the projection 64.

The flange 114 has a side surface area 134 extending parallel to the side surface area 104. The flange 116 has a side surface area 136 extending parallel to the side surface area 102. The side surface areas 134 and 136 engage the surface 98 on the lip 66 of the projection 64.

During construction of the power steering apparatus 10 the projection 64 is integrally formed on the housing 22 by punching the opening 62 in the housing 22 from the inside of the housing outward. The projection 64 is then struck from the opposite direction while the housing 22 is supported from the inside to cause the top edge of the projection to roll over and form the lip 66.

The seal 72 is placed on the conduit 50 in engagement with the bead 70. The conduit 50 is then placed into the opening 62. The clip 68 is slid into position on the projection 64. As the clip 68 is moved onto the projection 64, the side surface areas 102 and 104 on the clip are pressed against the bead 70 on the conduit 50. The side surface areas 134 and 136 on the flanges 114 and 116 on the clip 68 are disposed in abutting engagement with the surface 98 on the projection 64.

Figure 2:
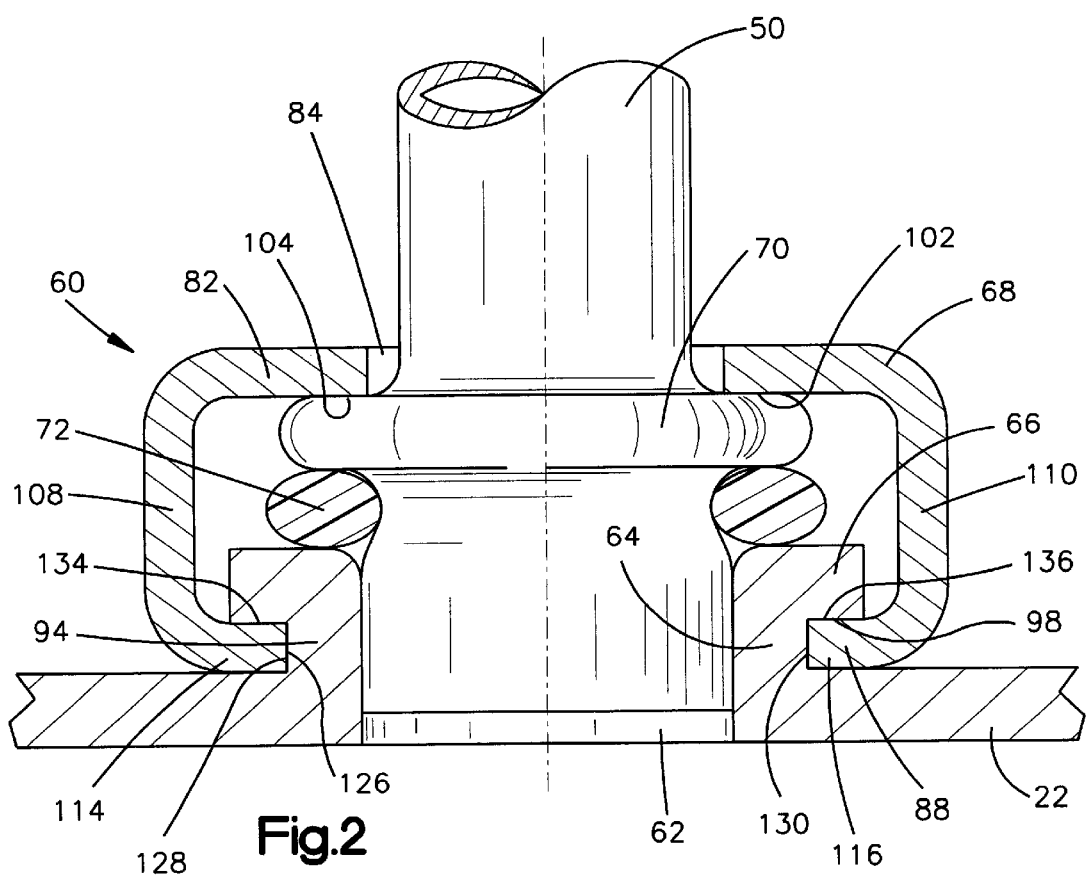
FIG. 2 is an enlarged fragmentary sectional view of a first embodiment of a connector assembly which connects a conduit with a housing in the power steering apparatus of FIG. 1.
Figure 3:
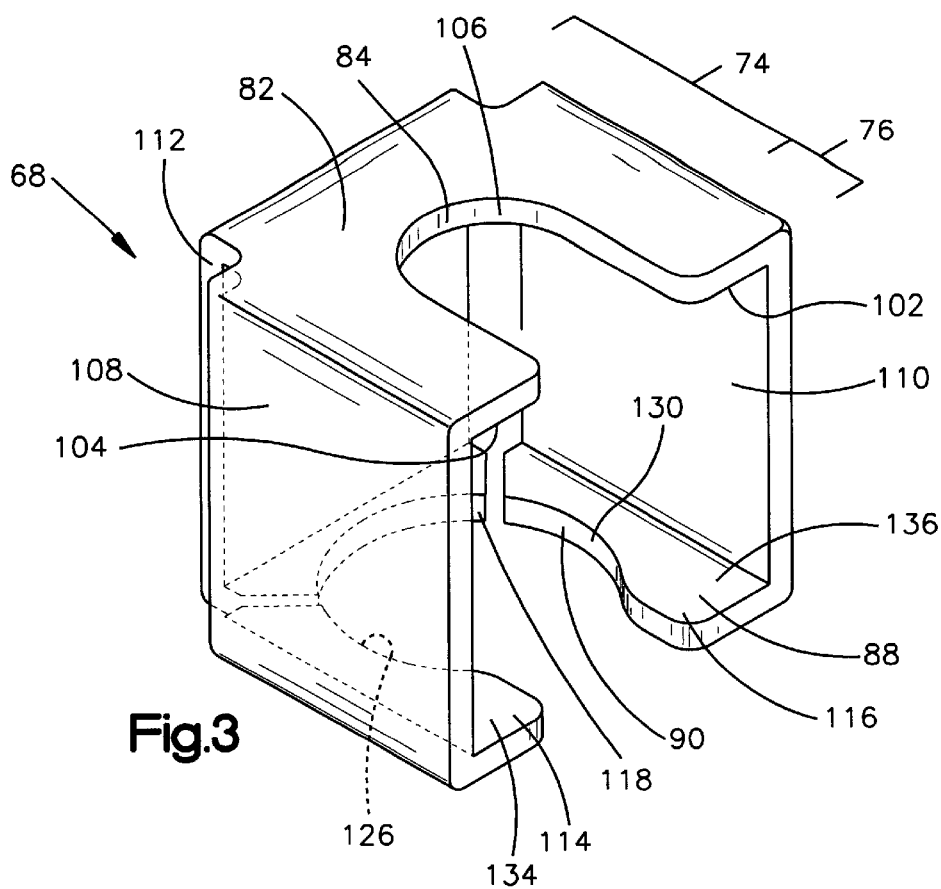
FIG. 3 is a pictorial illustration of a clip which is used in the connector assembly of FIG. 2.

Force is then applied against the clip 68 to cause the side surface areas 102 and 104 to move the bead 70 on the conduit 50 downward (as viewed in FIG. 2). The bead 70 on the conduit 50 moves toward the lip 66 on the projection 64 to resiliently compress the seal 72 between the bead 70 and the lip 66 of the projection 64.

As the clip 68 moves onto the bead 70 on the conduit 50 and onto the projection 64, the side surface areas 102 and 104 on the outer retainer wall 82 slide along the bead 70. At the same time, the side surface areas 134 and 136 on opposite sides of the recess 90 slide along the surface 98 on the lip 66. As the clip 68 moves onto the projection 64, the flanges 114 and 116 on the clip 68 engage the stem section 94 of the projection 64. The flanges 114 and 116 on the clip 68 are resiliently deflected away from each other by engagement of the outer side surface 128 on the stem section 94. As the clip 68 continues to move onto the projection 64, the stem section 94 of the projection 64 snaps into the space between the arcuate edge portions 126 and 130 of the flanges 114 and 116. At the same time, the conduit 50 moves to a position adjacent to the arcuate closed end portion 106 of the recess 84 in the outer retainer wall 82. At this time, the clip 68 is held against movement relative to the projection 64 by the flanges 114 and 116 which grip opposite sides of the stem section 94 of the projection. The outer retainer wall 82 presses the bead 70 on the conduit 50 against the seal 72 to hold the conduit 50 against axial movement relative to the projection 64.

Figure 4:
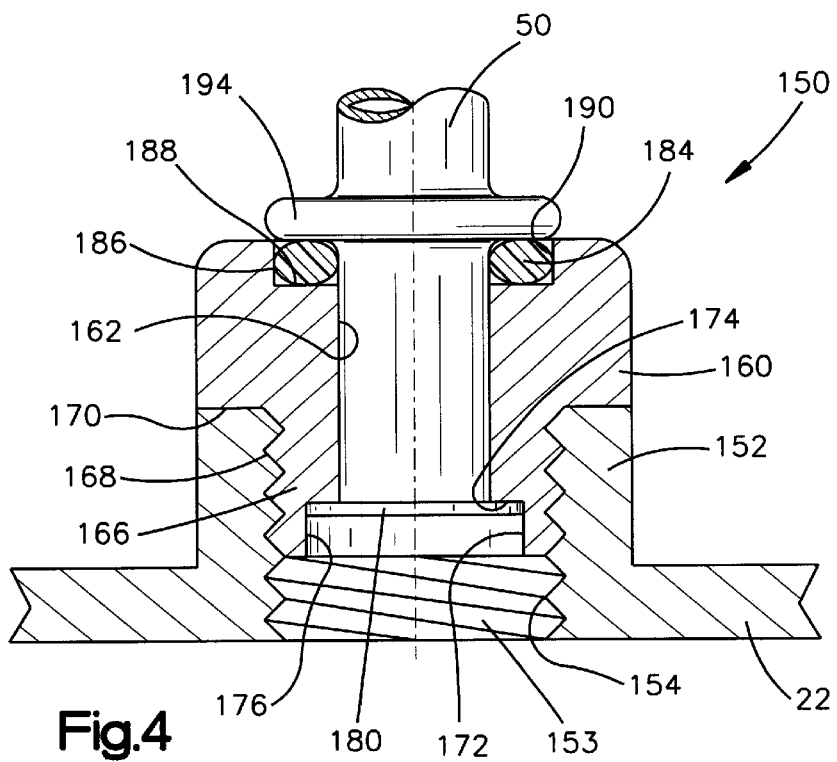
FIG. 4 is an enlarged fragmentary sectional view of a second embodiment of a connector assembly which connects a conduit with a housing in a power steering apparatus.

A second embodiment of a connector assembly for connecting the conduit 50 to the housing 22 of the power steering apparatus 10 is illustrated in FIG. 4. A connector assembly 150 is provided to connect the conduit 50 with a projection 152 integrally formed on the housing 22. The projection 152 is formed by punching an opening 153 in the housing 22 from the inside of the housing outward. The projection 152 has internal threads 154 for threadably receiving a member or nut 160.

The nut 160 has an axially extending opening 162 through which the conduit 50 extends. The nut 160 includes an axially extending portion 166 with external threads 168. The nut 160 is rotatable relative to the conduit 50 so that the threads 168 engage the threads 154 on the housing 22 to connect the conduit with the housing. The nut 160 has a radially extending surface 170 engageable with the projection 152.

The portion 166 includes a recess 172. The recess 172 is defined by a radially extending annular surface 174 and an axially extending cylindrical surface 176. The surface 176 extends perpendicular to the surface 174 to define the recess 172.

A radially extending flange 180 on an end of the conduit 50 is received in the recess 172. The radially extending surface 174 on the nut 160 engages the flange 180. The surface 174 engages the flange 180 to move the conduit 50 into the opening 153 when the nut 160 is threaded into the projection 152.

An annular seal 184 is received in a recess 186 in the nut 160. A radially extending annular surface 188 and an axially extending cylindrical surface 190 define the recess 186. The cylindrical surface 190 extends perpendicular to the surface 188 to define the recess 186. A radially extending bead 194 on the conduit 50 presses the seal 184 against the surface 188 of the recess 186 to seal the joint between the nut 160 and the conduit.

During construction of the power steering apparatus of the second embodiment, the projection 152 is integrally formed on the housing 22 by punching the opening 153 in the housing from inside the housing outward. The projection 152 is then threaded internally.

The seal 184 is placed on the conduit 50. The conduit 50 is placed through the opening 162 in the nut 160. The flange 180 is then formed on the conduit 50 to retain the nut 160 on the conduit. The bead 194 is then formed on the conduit 50 axially spaced from the flange 180 to retain the nut 160 axially relative to the conduit. The bead 194 is formed on the conduit 50 to press the seal 184 between the bead and the surface 186 on the nut 160.

The thread 168 on the nut 160 is coated with a sealing compound to prevent leakage. The nut 160 is then threaded into the projection 152 to connect the conduit 50 with the projection. As the nut 160 is threaded into the projection 152, the surface 174 on the nut moves downward, as viewed in FIG. 4, and engages the flange 180 to move the conduit 50 downward. The nut 160 is threaded into the projection 152 until the surface 170 on the nut engages the projection.

Figure 5:
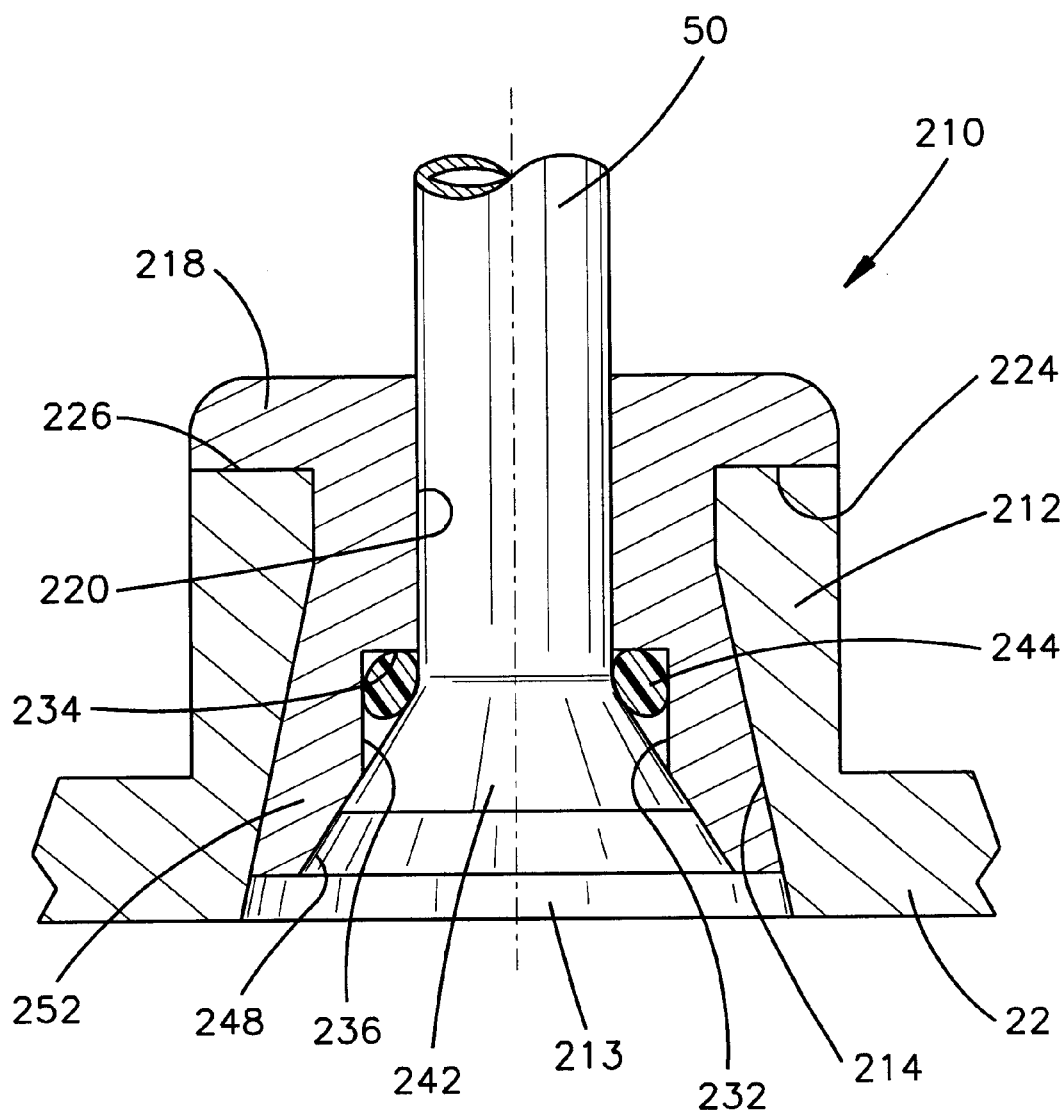
FIG. 5 is an enlarged fragmentary sectional view of a third embodiment of a connector assembly which connects a conduit with a housing in a power steering apparatus.

A third embodiment of a connector assembly for connecting the conduit 50 with the housing 22 of the power steering apparatus is illustrated in FIG. 5. A connector assembly 210 connects the conduit 50 to a projection 212 integrally formed on the housing 22. The projection 212 is formed by punching an opening 213 in the housing 22 from the inside of the housing outward. The projection 212 is formed with a frustoconical inner surface 214.

A member or rivet 218 connects the conduit 50 with the projection 212. The rivet 218 has an axially extending opening 220 through which the conduit 50 extends. A radially extending surface 224 on the rivet 218 engages a radially extending surface 226 on the projection 212.

The rivet 218 includes a recess 232. A radially extending annular surface 234 and an axially extending cylindrical surface 236 define the recess 232. The cylindrical surface 236 extends perpendicular to the annular surface 234.

A radially extending frustoconical end 242 of the conduit 50 presses an annular seal 244 against the surface 234 of the recess 232. The frustoconical end 242 of the conduit 50 engages a frustoconical surface 248 of the rivet 218. The end 242 of the conduit 50 engages the surface 248 to prevent the conduit 50 from moving relative to the rivet 218.

An axial end 252 of the rivet 218 is deformed into engagement with the frustoconical surface 214 of the projection 212. The end 252 of the rivet 218 is deformed into engagement with the surface 214 to connect the conduit 50 with the projection 212.

During construction of the power steering apparatus of the third embodiment, the projection 212 is integrally formed on the housing 22 by punching the opening 213 in the housing 22 from inside the housing outward. The projection 212 is formed with the frustoconical surface 214.

The rivet 218 is placed on the conduit 50 with the conduit extending through the opening 220. The seal 244 is then placed on the conduit 50. The end of the conduit 50 is then deformed to form the frustoconical end 242. The seal 244 is compressed between the surface 234 of the recess 232 and the end 242 of the conduit 50. The rivet 218 is then placed in the opening 213 in the housing 22. The end 252 of the rivet 218 is deformed into engagement with the frustoconical surface 214 of the projection 212 to retain the conduit 50 in the housing 22.

From the above description of the invention, those skilled in the art will perceive improvements, changes and modifications. Such improvements, changes and modifications within the skill of the art are intended to be covered by the appended claims.

Having described the invention, the following is claimed:

1. A power steering apparatus comprising:
   a housing defining a chamber for holding power steering fluid, said housing having an opening defined by a projection, said projection and said housing being a unitary, one-piece structure not including multiple pieces fastened together, an inner diameter of said projection defining said opening in said housing; and
   a conduit extending into said opening and connected with said projection on said housing;
   a connector assembly connecting said conduit with said projection on said housing, said connector assembly including a member engaging said conduit and said projection to connect said conduit with said projection.

2. A power steering apparatus as defined in claim 1 wherein said member comprises a clip which engages a radially extending bead on said conduit.

3. A power steering apparatus as defined in claim 2 wherein said clip has first and second side surface areas which are engageable with said bead on said conduit and third and fourth side surface areas which extend parallel to said first and second side surface areas and are engageable with a surface on said projection.

4. A power steering apparatus as defined in claim 3 wherein said surface on said projection is on a radially extending lip.

5. A power steering apparatus as defined in claim 2 wherein said clip includes a retainer section engaging said projection on said housing and said bead on said conduit and a pilot section for guiding movement of said clip relative to said projection and said conduit.

6. A power steering apparatus as defined in claim 2 wherein an annular seal is disposed between said projection on said housing and said bead on said conduit, said clip being engageable with said projection and said bead to press said seal between said projection and said bead.

7. A power steering apparatus as defined in claim 1 wherein said member includes a threaded nut with an opening through which said conduit extends, said nut being rotatable relative to said conduit and said projection on said housing, said projection threadably receiving said nut to connect said conduit to said projection.

8. A power steering apparatus as defined in claim 7 wherein said conduit includes an end with a radially extending annular flange, said nut including a surface engageable with said annular flange on said conduit to press said conduit into said opening.

9. A power steering apparatus as defined in claim 8 further including an annular seal disposed in a recess in said nut between a radially extending bead on said conduit and a second surface of said nut defining said recess, said bead being axially spaced from said annular flange.

10. A power steering apparatus as defined in claim 7 wherein said nut includes a radially extending surface engageable with said projection on said housing.

11. A power steering apparatus as defined in claim 7 wherein said nut has an external thread and said projection has an internal thread engageable with said external thread on said nut.

12. A power steering apparatus as defined in claim 1 wherein said member includes a rivet with an opening through which said conduit extends, said rivet being deformable into engagement with said housing to connect said conduit to said projection.

13. A power steering apparatus as defined in claim 12 wherein said housing includes a frustoconical surface defining said opening, said rivet being deformable into engagement with said frustoconical surface.

14. A power steering apparatus as defined in claim 12 further including an annular seal disposed in a recess in said rivet between a radially extending end of said conduit and a surface of said rivet defining said recess.

15. A power steering apparatus as defined in claim 12 wherein said conduit includes a frustoconical end engaging said rivet.

16. A method for connecting a conduit of a power steering apparatus to a housing defining a chamber for holding power steering fluid, said method including the steps of:

forming a projection on the housing to define an opening in the housing, the projection and the housing being a unitary, one-piece structure not including multiple pieces fastened together, an inner diameter of the projection defining the opening in the housing;

extending the conduit into the opening; and connecting the conduit to the projection with a connector assembly, said step of connecting the conduit with the projection including the step of engaging the conduit and the projection with a member of the connector assembly.

17. A method as defined in claim 16 further including the step of forming a radially extending lip on the projection.

18. A method as defined in claim 17 wherein said step of connecting the conduit to the projection includes moving a clip into engagement with a radially extending bead on the conduit and the lip on the projection.

19. A method as defined in claim 18 wherein said step of moving the clip into engagement with the bead on the conduit and the lip on the projection includes moving first and second side surface areas on the clip into engagement with the bead and moving third and fourth side surface areas on the clip that extend parallel to the first and second side surface areas into engagement with the lip on the projection.

20. A method as defined in claim 18 further including the step of disposing an annular seal between the projection on the housing and the bead on the conduit, said step of moving the clip into engagement with the bead and the lip including pressing the seal between the bead and the projection.

21. A method as defined in claim 16 wherein said step of connecting the conduit to the projection with a connector assembly includes extending the conduit through an opening in a threaded nut and threadably engaging the nut with the projection.

22. A method as defined in claim 21 wherein said step of threadably engaging the nut with the projection includes engaging a radially extending annular flange on the conduit with the nut to press the conduit into the opening.

23. A method as defined in claim 21 further including the step of disposing an annular seal in a recess in the nut between a radially extending bead on the conduit and a surface of the nut defining the recess.

24. A method as defined in claim 16 wherein said step of connecting the conduit to the projection with a connector assembly includes extending the conduit through an opening in a rivet and deforming the rivet into engagement with the housing.

25. A method as defined in claim 24 wherein said step of deforming the rivet includes deforming the rivet into engagement with a frustoconical surface of the housing defining the opening.

26. A method as defined in claim 25 wherein said step of deforming the rivet includes axially moving a frustoconical end of the conduit into engagement with the rivet to deform the rivet into engagement with the frustoconical surface of the housing.

27. A method as defined in claim 24 further including disposing an annular seal in a recess in the rivet between a radially extending end of the conduit and a surface of the rivet defining the recess.

28. A method for connecting a conduit of a power steering apparatus to a housing defining a chamber for holding power steering fluid, said method including the steps of:

integrally forming a projection on the housing to define an opening in the housing;

extending the conduit into the opening;

connecting the conduit to the projection with a connector assembly, said step of connecting the conduit with the projection including the step of engaging the conduit and the projection with a member of the connector assembly; and said step of integrally forming a projection on the housing includes the step of punching the opening in the housing from an inside of the housing outward.

* * * * *